(12) United States Patent
Saha et al.

(10) Patent No.: US 10,496,519 B2
(45) Date of Patent: Dec. 3, 2019

(54) METHOD INVOCATION SYNTHESIS FOR SOFTWARE PROGRAM REPAIR

(71) Applicant: FUJITSU LIMITED, Kawasaki-shi, Kanagawa (JP)

(72) Inventors: Ripon K. Saha, Santa Clara, CA (US); Mukul R. Prasad, San Jose, CA (US); Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 15/436,595

(22) Filed: Feb. 17, 2017

(65) Prior Publication Data
US 2018/0239687 A1    Aug. 23, 2018

(51) Int. Cl.
*G06F 11/36* (2006.01)

(52) U.S. Cl.
CPC ........ *G06F 11/362* (2013.01); *G06F 11/3692* (2013.01)

(58) Field of Classification Search
CPC .. G06F 11/07; G06F 11/0718; G06F 11/0793; G06F 11/08; G06F 11/14; G06F 11/362–3696; G06F 8/40
USPC ...... 717/124–136; 714/2, 25–26, 38.1–38.14
See application file for complete search history.

(56) References Cited

U.S. PATENT DOCUMENTS

| | | | | |
|---|---|---|---|---|
| 8,516,446 B2 * | 8/2013 | Williams | ............ | G06F 9/44589 717/124 |
| 9,383,973 B2 * | 7/2016 | Villar | ........................ | G06F 8/33 |
| 2011/0289483 A1 * | 11/2011 | Williams | ................... | G06F 8/36 717/126 |
| 2013/0007700 A1 * | 1/2013 | Villar | ........................ | G06F 8/33 717/109 |

OTHER PUBLICATIONS

Gvero, T., et al., "On Repairing Ill-Typed Expressions", Infoscience [online], 2013 [retrieved Feb. 1, 2019], Retrived from Internet: <URL: https://infoscience.epfl.ch/record/190024>, pp. 1-20.*

Galenson, J., Dynamic and Interactive Synthesis of Code Snippets, escholarship.org [online], 2014 [retrieved Feb. 2, 2019], Retrieved from Internet: <URL: https://escholarship.org/uc/item/6js5v4bj>, pp. 1-96.*

(Continued)

*Primary Examiner* — Todd Aguilera
(74) *Attorney, Agent, or Firm* — Maschoff Breenan

(57) ABSTRACT

A method may include obtaining a plurality of synthesized method invocations using a plurality of objects and a plurality of methods of a software program. The method may also include determining a prioritization of the plurality of synthesized method invocations based on one or more of: relationships between one or more characteristics of each of the plurality of synthesized method invocations and a fault location; and relationships between the one or more characteristics and an error report that corresponds to the fault location. The method may also include selecting a synthesized method invocation from the plurality of synthesized method invocations for repair operations with respect to the fault location based on a corresponding prioritization of the selected synthesized method invocation. In addition, the method may include performing repair operations with respect to the fault location and the selected synthesized method invocation.

19 Claims, 7 Drawing Sheets

(56) References Cited

OTHER PUBLICATIONS

Kim D., et al., "Automatic Patch Generation Learned from Human-Written Patches", Proceedings of the 2013 Int'l. Conf. on Software Engineering [online], 2013 [retrieved Feb. 4, 2019], Retrived from Internet: <URL: https://ieeexplore.ieee.org/stamp/stamp.jsp?arnumber=6606626>, pp. 802-811.*

Saha, R., et al., "Elixir: Effective Object-Oriented Program Repair", Proceedings of the 2017 32nd IEEE/ACM Int'l. Conf. on Automated Software Engineering [online], Oct.-Nov. 2017 [retrieved Feb. 4, 2019], Retrieved from Internet: <https://ieeexplore.ieee.org/abstract/document/8115675>, pp. 648-658.*

Repair Anti-patterns (FSE'16); Anti-patterns in Search-Based Program Repair, Tan et al., 2016.

PAR (Kim et al., ICSE'13); Automatic Patch Generation Learned from Human-Written Patches, 2013.

Pending U.S. Appl. No. 14/957,529, filed Dec. 2, 2015, by Yoshida et al.

Pending U.S. Appl. No. 15/051,503, filed Feb. 23, 2016, by Yoshida et al.

Nguyen et al., "SemFix: program repair via semantic analysis" (ICSE, May 18, 2013).

DeMarco et al., "Automatic Repair of Buggy If Conditions and Missing Preconditions with SMT" (CSTVA, Apr. 11, 2014).

Kaleeswaran, et al., "MintHint: Automated Synthesis of Repari Hints" (ICSE', May 31, 2014).

Mechtaev et al., "DirectFix: Looking for Simple Program Repairs" (ICSE, May 16, 2015).

Goues et al., ICSE'09, "A Systematic Study of Automated Program Repair: Fixing 55 out of 105 Bugs for $8 Each" (Jun. 2, 2012).

Tan et al., "relifix: Automated Repair of Software Regression" (ICSE, Sep. 12, 2014).

Long et al., "An Analysis of Patch Plausibility and Correctness for Generate-and-Validate Patch Generation Systems", ISSTA, Jul. 14, 2015.

Long et al., "Staged Program Repair with Condition Synthesis", FSE, Aug. 30, 2015.

* cited by examiner

METHOD INVOCATION SYNTHESIS FOR SOFTWARE PROGRAM REPAIR

FIELD

The embodiments discussed in the present disclosure are related to method invocation synthesis for software program repair.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a plurality of synthesized method invocations using a plurality of objects and a plurality of methods of a software program. The method may also include determining a prioritization of the plurality of synthesized method invocations based on one or more of: relationships between one or more characteristics of each of the plurality of synthesized method invocations and a fault location; and relationships between the one or more characteristics and an error report that corresponds to the fault location. The method may also include selecting a synthesized method invocation from the plurality of synthesized method invocations for repair operations with respect to the fault location based on a corresponding prioritization of the selected synthesized method invocation. In addition, the method may include performing repair operations with respect to the fault location and the selected synthesized method invocation.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
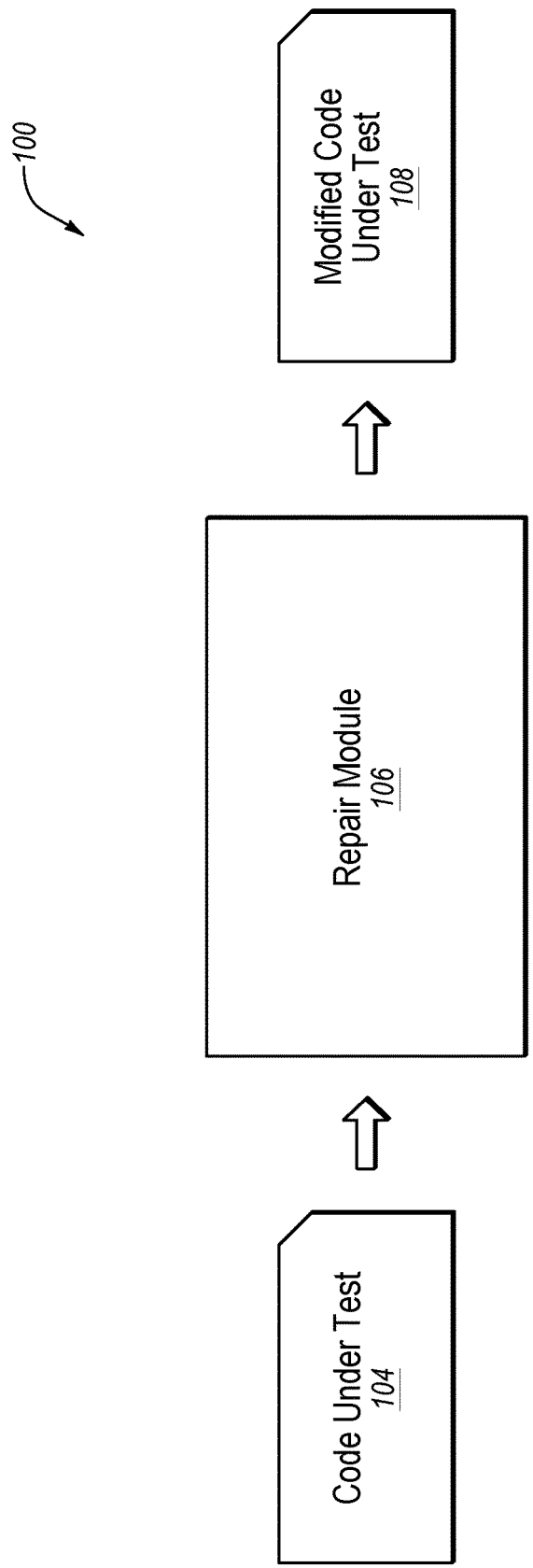
FIG. 1 is a diagram representing an example environment related to repairing a software program.

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. In some instances, method invocations may be used as repairs to correct faults.

According to one or more embodiments described in the present disclosure, one or more fault locations may be identified in a software program. Additionally, multiple method invocations may be synthesized as potential repair candidates for a particular fault location. In some embodiments, the method invocations may each be scored based on one or more relationships between one or more characteristics of a corresponding method invocation with respect to the particular fault location. In some instances, such score may be referred to as a "context score" in the present disclosure. Additionally or alternatively, the method invocations may each be scored based on one or more relationships between one or more characteristics of the corresponding method invocation with respect to an error report that corresponds to the particular fault location. In some instances, such score may be referred to as an "error report score" in the present disclosure.

In some embodiments, the method invocations may be prioritized as potential repair candidates for the particular fault location based on the scoring. In the present disclosure reference to prioritizing method invocations may include ranking method invocations such that a method invocation with a higher priority may be selected during the performance of repair operations prior to a method invocation with a lower priority. Additionally or alternatively, prioritizing method invocations may include discarding or pruning method invocations. Method invocations that are discarded or pruned may not be chosen during the performance of repair operations in some instances.

For example, in some embodiments, a particular synthesized method invocation may be selected for repair operations (e.g., to be implemented as a repair) over other synthesized method invocations based on the particular synthesized method invocation having a higher priority than the other synthesized method invocations. In these or other embodiments, repair operations may be performed using the selected particular synthesized method invocation as a repair.

The synthesis and prioritization of method invocations as potential repair candidates for a fault location may improve the efficiency of automated software program repair by identifying which method invocations may be added to the software program used as repairs and also identifying which method invocations are more likely to actually repair the software program.

Embodiments of the present disclosure are explained with reference to the accompanying drawings.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104.

In some embodiments, the repair module 106 may be configured to perform one or more of the repair operations based on a repair template 112 and one or more test suites 111.

For example, the repair module 106 may be configured to apply one or more test suites with respect to the code under test 104 to detect or determine one or more faults and corresponding fault locations in the code under test 104. In some embodiments, the repair module 106 may be configured to execute one or more tests included in the test suites, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

In some embodiments, the repair module 106 may be configured to identify one or more fault locations in the code under test 104 based on the execution of one or more tests of the test suites. In these or other embodiments, the repair module 106 may be configured to generate multiple method invocations (referred to as "synthesized method invocations") with respect to each of one or more of the fault locations. The synthesized method invocations with respect to a particular fault location may be potential repair candidates and may be implemented in the code under test 104 to modify the code under test 104 and possibly repair the fault at the particular fault location. Additionally or alternatively, in some embodiments, the synthesized method invocations may be generated based on the particular fault location.

For example, a method invocation may have the following basic structure: "(object.)MI_name(arg1, arg2, . . . , argN)." In such structure, the portion labeled "object" may refer to the object or object class or another method invocation returning an object that may be changed or defined by the method invocation (referred to as a "defined object" in the present disclosure); "MI_name" may refer to a name of the method that may be the subject of the method invocation; and "arg1, arg2, . . . argN" may refer to objects, primitive variables, or other method invocations returning objects or primitive variables that are used as input parameters (also referred to as "arguments") for the method of the method invocation. Note that a method may be used as an argument or defined object in a method invocation, but in the present disclosure reference to a method of a method invocation may generally refer to the method that corresponds to "MI_name" and may be referred to as a "subject method." Additionally, objects that may be used as the defined object or an argument of a method invocation may be referred to as "objects of the method invocation" or "objects used by the method invocation."

Additionally, in some embodiments, the repair module 106 may be configured to identify one or more objects that may be within a scope of the code under test 104 that corresponds to the particular fault location. In some embodiments, the repair module 106 may be configured to identify all of the objects that may be within the scope of the code under test 104 that corresponds to the particular fault location. An object may include a primitive variable, an instance of a data structure or class, an instance of a class returned by a function, a method etc. In the present disclosure, reference to the "objects in scope" of the code under test 104 that corresponds to the particular fault location may refer to the objects that are valid at the fault location in that those objects may be used without breaking the code under test 104.

The repair module 106 may be configured to generate one or more synthesized method invocations based on the identified objects. For example, the repair module 106 may be configured to obtain the methods from the identified objects that may be the subject methods of the synthesized method invocations. In these or other embodiments, the repair module 106 may be configured to identify a method signature for each of the subject methods. A method signature of a particular subject method may include an object type of a defined object that may be defined by the particular subject method, a number of arguments of the particular subject method, and/or the object types of the arguments of the particular subject method. As such, in some embodiments, the method signature identification for the particular subject method may include identifying the object types of the defined object and the arguments of the particular subject method. Additionally or alternatively, the method signature detection for the particular subject method may include identifying the number of arguments of the particular subject method.

The repair module 106 may be configured to generate the synthesized method invocations based on the subject methods, the signatures of the subject methods, and the other identified objects and their corresponding types. For example, a particular method signature of a particular subject method may indicate that the defined object for the subject method is an integer and that the subject method includes two arguments in which one of the arguments is a method of a particular type and the other argument is a string. In such instances, the repair module 106 may be configured to generate multiple synthesized method invocations for a particular subject method by using objects that are integers as the defined object, objects that are methods of the particular type as the first argument, and objects that are strings as the second argument. In some embodiments, the repair module 106 may generate every possible permutation of synthesized method invocations for the particular subject method with respect to using each identified object that is an integer type as the defined object, using each identified method that is of the particular type as the first argument, and using each identified object that is a string type as the second argument.

Additionally, in generating the synthesized method invocations for the particular subject method, the repair module 106 may be configured to ignore, for the defined object, all identified objects that are not integer types, ignore, for the first argument, all objects that are not methods of the particular type, and ignore for the second argument, all objects that are not of a string type. In some instances, the identification of identified objects that may be compatible with the method signature and the ignoring of identified objects that may not be compatible with the method signature may be referred to as resolving the objects with respect to the method signature. In the present disclosure, reference to objects being compatible with the method signature may indicate that the objects may be of a type that is compatible for being used as a defined object or an argument of the method invocation that corresponds to the method signature.

As indicated above, in some embodiments, the synthesized method invocations may be potential repair candidates for a particular fault location. In some embodiments, the repair module 106 may be configured to prioritize which of the synthesized method invocations to implement as a repair for the particular fault location. In some embodiments, the prioritization may be based on characteristics of the synthesized method invocations that may indicate the effectiveness of the synthesized method invocations as repairs for the particular fault location. For example, in some instances relationships between one or more characteristics of the synthesized method invocations and the particular fault location may indicate the effectiveness of the synthesized method invocations as repairs. As another example, relationships between one or more characteristics of the synthesized method invocations and an error report that corresponds to the particular fault location may indicate the effectiveness of the synthesized method invocations.

In some embodiments, the characteristics of the synthesized method invocations that may be used to determine the context score and/or the error report score may include: a return type of the corresponding synthesized method invocation; a location of each of one or more of the objects used by the corresponding synthesized method invocation; a name of the method of the corresponding synthesized method invocation; a name of each of one or more of the objects used by the corresponding synthesized method invocation; a type of each of one or more of the objects used by the corresponding synthesized method invocation; a type of use of each of one or more of the objects in the corresponding synthesized method invocation; a number of occurrences of each of one or more of the objects used by the corresponding synthesized method invocation, or any combination thereof. In some embodiments, one or more of the characteristics may be determined based on the corresponding method signature such that the corresponding method signature may also be a characteristic of its corresponding method invocation that includes more than one of the characteristics listed above.

Additionally or alternatively, the relationships between one or more of the characteristics and the fault location may include: a return type relationship between the return type of the corresponding synthesized method invocation and the fault location; the location of each of one or more of the objects used by the corresponding method invocation with respect to the fault location; the number of occurrences of one or more of the objects used by the corresponding method invocation within a particular number of lines of the fault location; a semantic similarity between the name of the method of the corresponding synthesized method invocation with a name of a method of a currently implemented method invocation that corresponds to the fault location, or any combination thereof. Further in some embodiments, the relationships between one or more of the characteristics and the error report may include: a semantic similarity between the name of the method of the corresponding method invocation with respect to one or more words included in the error report; a semantic similarity between the name of one or more of the objects with respect to one or more words included in the error report; a semantic similarity between a name of the type of one or more of the objects used by the corresponding method invocation with respect to one or more words included in the error report, or any combination thereof.

Additionally or alternatively, the prioritization may be based on a score that may be generated for each of the synthesized method invocations. In some embodiments the score may provide an indication of one or more of the relationships described above. For example, in some embodiments, the score may include a context score and/or an error report score. The context score may be based on relationships between one or more characteristics of each of the synthesized method invocations and the particular fault location in some instances. In some embodiments, the repair module 106 may be configured to generate the context score based on one or more operations described below with respect to a method 500 of FIG. 5. The error report score may be based on relationships between one or more characteristics of each of the synthesized method invocations and an error report that corresponds to the particular fault location in some instances. In some embodiments, the repair module 106 may be configured to generate the error report score based on one or more operations described below with respect to a method 600 of FIG. 6.

In these or other embodiments, the score may include a composite score that may be based on the context score and the error report score. In some embodiments, the composite score may be generated based on one or more operations described below with respect to a method 700 of FIG. 7.

As indicated above, in some embodiments, the repair module 106 may be configured to prioritize the synthesized method invocations for repair operations based on the context scores, the error report scores, and/or the composite scores of the synthesized method invocations. In some embodiments, the prioritization may be performed based on one or more operations described below with respect to a method 300 of FIG. 3 and the method 400 of FIG. 4.

In some embodiments, the repair module 106 may be configured to select a particular synthesized method invocation to implement as a repair for the particular fault location based on the priority of the particular method invocation. For example, the prioritization may be used to determine an order of selection of synthesized method invocations during the performance of the repair operations. For instance, a synthesized method invocation with a higher priority may be selected as a repair prior to the selection of a synthesized method invocation with a lower priority. For example, the repair module 106 may compare the priorities of each of the different synthesized method invocations and based on the comparison of the priorities, the repair module 106 may select a particular synthesized method invocation that has a higher priority instead of selecting a synthesized method invocation that has a lower priority.

The repair module 106 may also be configured to perform repair operations on the code under test 104 with respect to the particular fault location and the selected synthesized method invocation. For example, the repair operations may include implementing the selected synthesized method invocation at the particular fault location as a particular patch and performing tests on the particular patch. The repair module 106 may be configured to keep the particular patch in response to the tests passing. Additionally or alternatively, in response to one or more of the tests not passing, the repair module 106 may be configured to select a different synthesized method invocation to be implemented as a patch. In these or other embodiments, the repair module 106 may select the other synthesized method invocation based on the prioritization.

Additionally or alternatively, in response to the tests passing, the repair module 106 may be configured to output the modified code under test 108, which may include one or more patches that may include one or more implementations of synthesized method invocations. In these or other embodiments, the repair module 106 may be configured to output the modified code under test 108 in response to keeping the implementations of the synthesized method invocations in the code under test 104.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites, and the repair template may be combined or separated. In some embodiments operations may be performed in a different order from what is described above.

Figure 2:
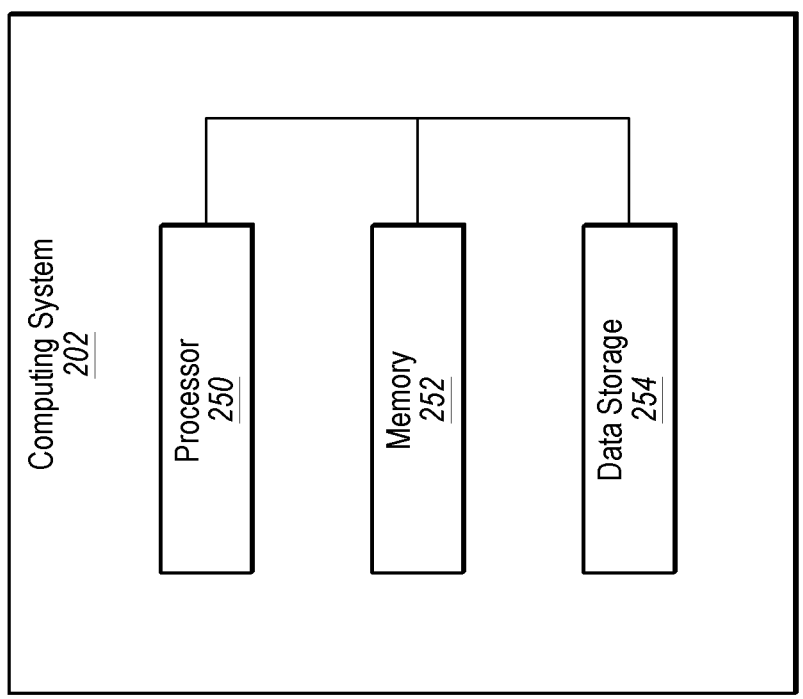
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106 of FIG. 1). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
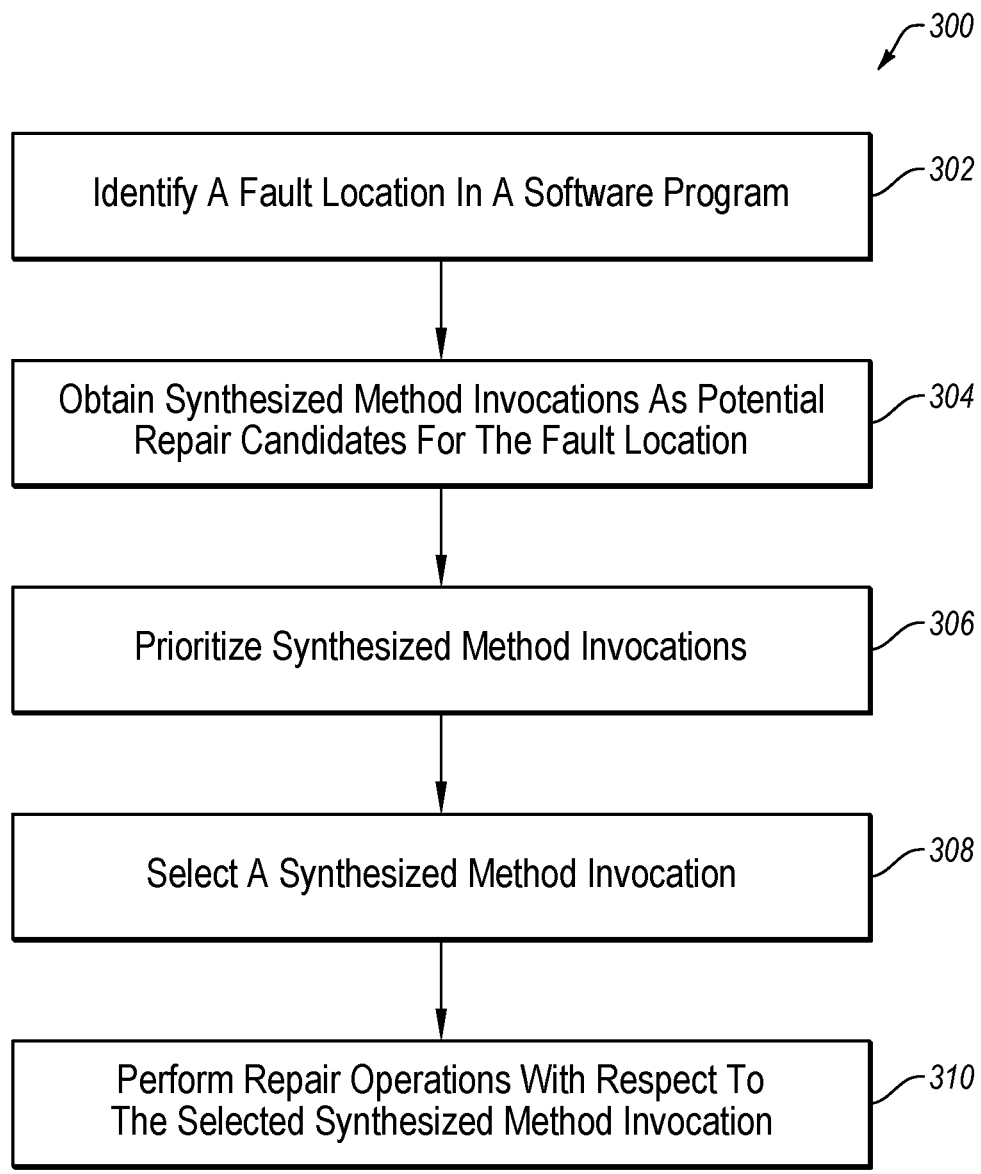
FIG. 3 depicts a flowchart of an example method of repairing a software program.

FIG. 3 depicts a flowchart of an example method 300 of repairing a software program, according to at least one embodiment described in the present disclosure. The method 300 may be performed by any suitable system, apparatus, or device with respect to code under test (e.g., the code under test 104 of FIG. 1) of the software program. For example, the repair module 106 of FIG. 1 or the computing system 202 of FIG. 2 (e.g., as directed by a repair module) may perform or direct performance of one or more of the operations associated with the method 300 with respect to the software program. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which a fault and a corresponding fault location may be identified in the software program. The fault identification may be performed with respect to the software program using any suitable technique. For example, in some embodiments, the fault identification may be performed based on performing a test execution of the one or more test suites with respect to the software program.

At block 304, multiple synthesized method invocations may be obtained as repair candidates for the fault location identified at block 302. In some embodiments, the synthesized method invocations may be obtained from another system that already generated the synthesized method invocations. Additionally or alternatively, in some embodiments, the synthesized method invocations may be obtained by being generated based on one or more operations of the method 400 of FIG. 4 described in detail below.

At block 306, the synthesized method invocations may be prioritized. The prioritization may indicate a priority of implementation of the synthesized method invocations as a patch for the fault location identified at block 302. In some embodiments, the prioritization of the synthesized method invocations may be based on a context score, an error report score, and/or a composite score that is based on the context score and the error report score of each of the synthesized method invocations. The generation of the scores and corresponding prioritization may be performed based on one or more operations of the methods 400, 500, and/or 600 in some embodiments.

At block 308, a particular synthesized method invocation may be selected based on the priority of the particular synthesized method invocation. For example, the repair module may compare the priorities of each of the different synthesized method invocations. A first synthesized method invocation may have a first priority that is higher priority than each of the other synthesized method invocations. Based on the comparison of the priorities, the repair module may select the first synthesized method invocation that has a higher priority instead of selecting a second synthesized method invocation that has a lower priority. At block 310, repair operations may be performed on the software program with respect to the particular fault location and the selected synthesized method invocation.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which one or more operations may be performed with respect to a single fault location at a time. Additionally or alternatively, one or more operations associated with one or more blocks may be performed with respect to multiple fault locations at a time.

Figure 4:
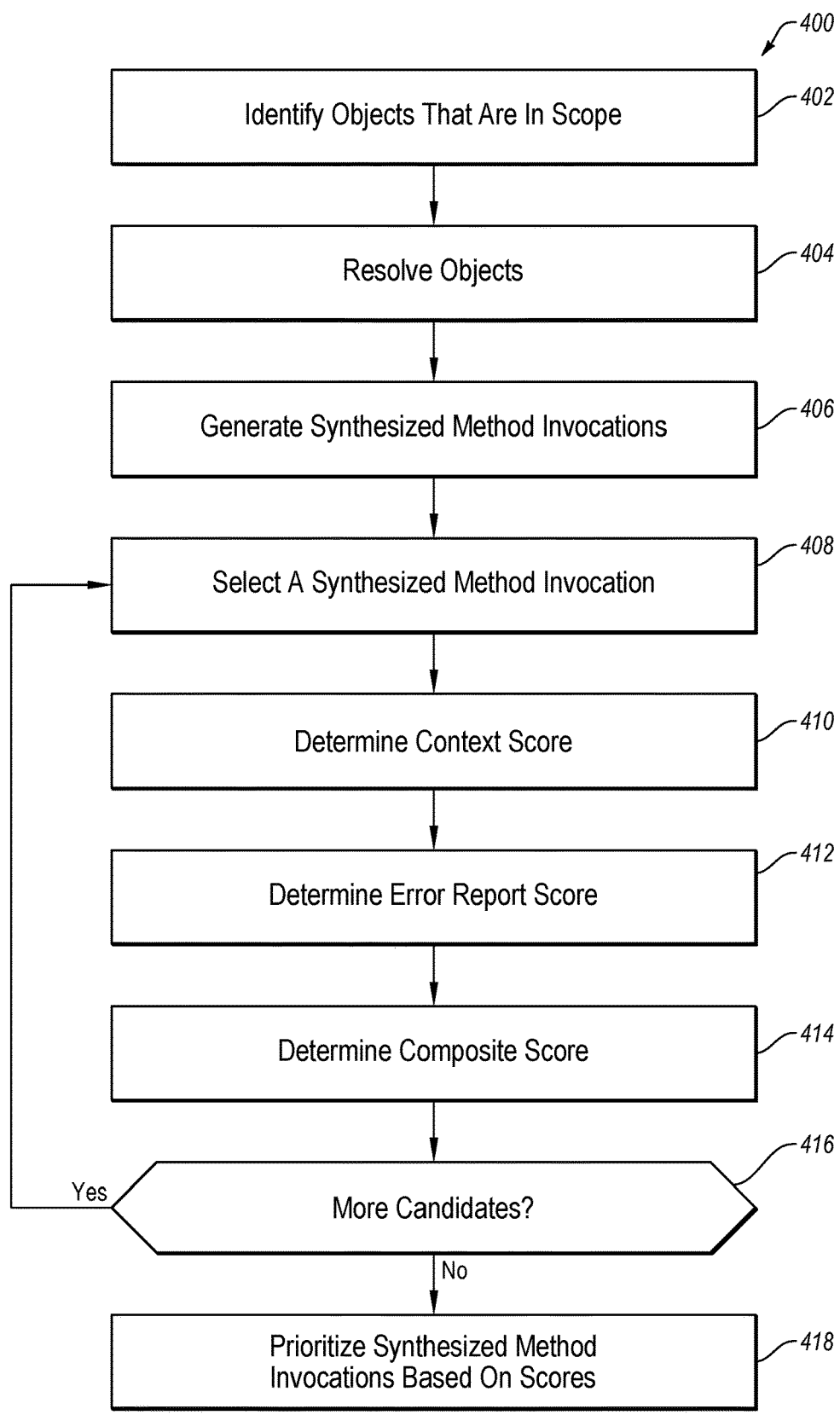
FIG. 4 depicts a flowchart of an example method of generating and prioritizing synthesized method invocations that may be used as repair candidates.

FIG. 4 depicts a flowchart of an example method 400 of generating and prioritizing synthesized method invocations that may be used as repair candidates, according to at least one embodiment described in the present disclosure. The method 400 may be performed by any suitable system, apparatus, or device with respect to code under test. For example, the repair module 106 of FIG. 1 or the computing system 202 of FIG. 2 (e.g., as directed by a repair module) may perform or direct performance of one or more of the operations associated with the method 400 with respect to code under test of the software program. Although illustrated with discrete blocks, the steps and operations associated with one or more of the blocks of the method 400 may be divided into additional blocks, combined into fewer blocks, or eliminated, depending on the particular implementation. As indicated above, in some instances, one or more of the operations of the method 400 may be performed with respect to block 304 and/or block 306 of the method 300.

The method 400 may begin at block 402, where one or more objects that are within a particular scope of the software program that corresponds to an identified fault location may be identified. In some embodiments, all of the objects within the particular scope may be identified. In some embodiments, identification of the objects may include identification of object characteristics such as object types, locations of the objects in the code, signatures of identified methods included in the objects, etc.

At block 404, the identified objects may be resolved for the generation of method invocations. For example, the identified methods may be potential subject methods of the synthesized method invocations and the method signatures of the identified methods may be identified. Based on the method signatures, it may be determined which types of objects may be defined objects and/or arguments for the corresponding identified methods. In these or other embodiments, identified objects with types that are compatible with the defined objects of the identified methods may be designated as a potentially defined object of each corresponding identified method. Additionally or alternatively, identified objects that are not compatible with the defined objects of the identified methods may also be designated as not being potentially defined objects for each corresponding identified method. In these or other embodiments, identified objects with types that are compatible with argument types of the identified methods may be identified and designated as being potential arguments for each corresponding identified method. Further, identified objects with types that are not compatible with argument types of the identified methods may be identified and designated as not being potential arguments for each corresponding identified method.

For example, a defined object of a particular method may be an integer type such that every identified object that is an integer type may be designated as a potential defined object of the particular method. In these and other embodiments, every identified object that is not an integer type may be designated as not being a potential defined object of the particular method. Similar operations may be performed with respect to identifying objects that may be used as arguments for the particular method based on the argument types indicated by the method signature of the particular method.

At block 406, multiple method invocations may be generated based on the identified methods that may be used as subject methods and one or more of the other identified objects. In some embodiments, multiple method invocations may be generated for a particular subject method. For example, each method invocation of a particular subject method may be generated by implementing a compatible object as the defined object and implementing compatible objects as arguments as indicated by the resolving. In some embodiments, every possible permutation of method invocations may be generated for the particular subject method. Additionally or alternatively, every possible permutation of method invocations may be generated for every subject method that may be identified.

At block 408, a particular synthesized method invocation of the multiple synthesized method invocations may be selected. At block 410, in some embodiments a context score may be determined for the particular synthesized method invocation. As indicated above, the context score may be based on relationships between one or more characteristics of the particular synthesized method invocation and the fault location in some instances. In some embodiments, the context score may be generated based on one or more operations described below with respect to the method 500 of FIG. 5.

At block 412, in some embodiments, an error report score may be determined for the particular synthesized method invocation. The error report score may be based on relationships between one or more characteristics of the particular synthesized method invocation and an error report that corresponds to the particular fault location in some instances. In some embodiments, the error report score may be generated based on one or more operations described below with respect to the method 600 of FIG. 6.

At block 414, a composite score may be determined for the particular synthesized method invocation in some embodiments. The composite score may be based on the context score of the particular synthesized method invocation and the error report score of the particular synthesized method invocation in some embodiments. In some embodiments, the composite score may be generated based on one or more operations described below with respect to the method 700 of FIG. 7.

At block 416 it may be determined whether there are any more synthesized method invocations that have not been scored (e.g., received a context score, an error report score, and/or a composite score). In response to determining that there are synthesized method invocations that have not been scored, the method 400 may return to block 408. In some embodiments, the method 400 may repeat the operations of blocks 408, 410, 412, 414, and 416 until all the synthesized method invocations have been scored.

At block 418, the synthesized method invocations may be prioritized based on the scoring. For example, in some embodiments, the composite scores of the synthesized method invocations may have a range between "0" and "1" in which a score of "1" indicates a high likelihood of the corresponding synthesized method invocation being a valid repair for the fault location and in which a score of "0" indicates a low likelihood of the corresponding synthesized method invocation being a valid repair for the fault. As such, in some embodiments, the prioritization of the synthesized method invocations may be such that synthesized method invocations with higher scores may be prioritized over synthesized method invocations with lower scores. For instance, the synthesized method invocations may be ordered in a list according to their respective scores in which the highest score is at the top of the list and the lowest score is at the bottom of the list. In such an instance, the prioritization may be based on the list order with the highest priority being with respect to the top of the list.

Additionally or alternatively, the prioritization may include discarding or pruning one or more of the synthesized method invocations from consideration as a repair candidate. For example, in some embodiments, synthesized method invocations with a score (e.g., a feature score, an error report score, or a composite score) that is lower than a threshold value may be discarded from consideration as a potential repair candidate. In some embodiments, the threshold value may be set based on time and computation resources that may be available for error correction operations. For example, if unlimited time or infinite resources are available, the threshold may be zero. However, in practice, both the time and resources are likely limited. As such, the threshold value may be set based on previous empirical knowledge, or learning from a training dataset using a machine learning technique.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the determination of the composite scores may be performed after generation of all of the context scores and error report scores. Additionally or alternatively, determination of the context score or determination of the error report score may be omitted in some embodiments. In these or other embodiments, determination of the composite score may also be omitted.

In addition, in some embodiments, the method 400 may be performed iteratively in which a single fault location may be analyzed at a time. Additionally or alternatively, one or more operations associated with one or more blocks may be performed with respect to multiple fault locations at a time. Further, in some embodiments, the operations associated with blocks 408, 410, 412, and 414 may be performed iteratively with respect to a single synthesized method invocation at a time. Additionally or alternatively, one or more operations associated with blocks 408, 410, and 412 may be performed with respect to multiple synthesized method invocations at a time. Moreover, in some embodiments, the synthesized method invocations may have already been generated such that one or more operations with respect to blocks 402, 404, and 406 may be omitted in some instances.

Figure 5:
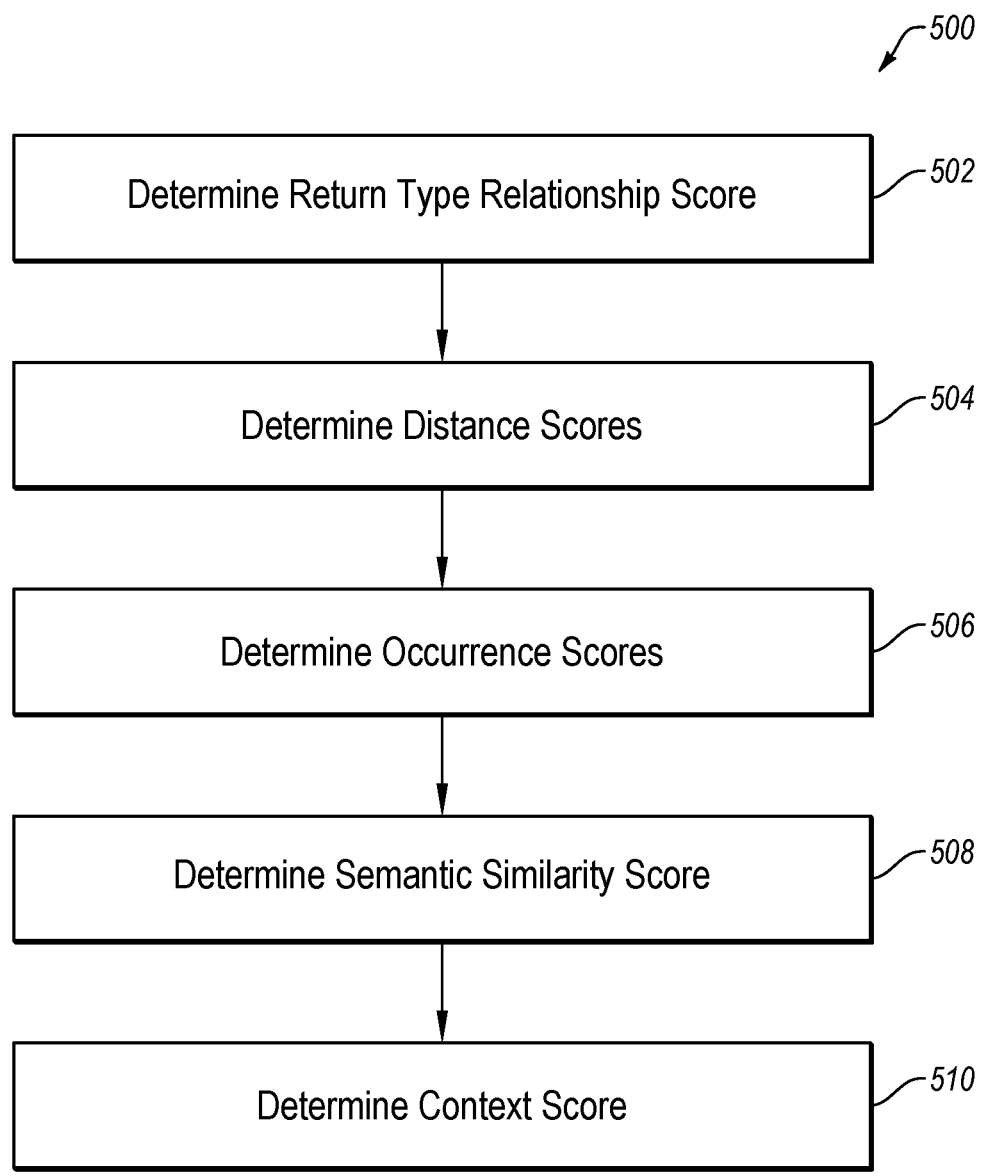
FIG. 5 depicts a flowchart of an example method of determining a context score of a method invocation that may be a repair candidate for a fault location.

FIG. 5 depicts a flowchart of an example method 500 of determining a context score, according to at least one embodiment described in the present disclosure. The method 500 may be performed by any suitable system, apparatus, or device with respect to code under test (e.g., the code under test 104 of FIG. 1). For example, the repair module 106 of FIG. 1 or the computing system 202 of FIG. 2 (e.g., as directed by a repair module) may perform or direct performance of one or more of the operations associated with the method 500 with respect to a method invocation (e.g., a synthesized method invocation such as described above) that may be a potential repair candidate for a fault location of code under test of the software program (referred to as a "candidate method invocation"). Although illustrated with discrete blocks, the steps and operations associated with one or more of the blocks of the method 500 may be divided into additional blocks, combined into fewer blocks, or eliminated, depending on the particular implementation.

The method 500 may begin at block 502, where a return type relationship score may be determined for the candidate method invocation. The return type relationship score may indicate a relationship between the return type of the candidate method invocation and the fault location. By way of a first example, the fault location may correspond to a line of code that defines a variable that is an integer and the candidate method invocation may return an integer. The return type relationship score in the first example may reflect that the candidate method invocation may have a higher priority given to it based on the return type relationship being compatible with the fault location. By way of a second example, the fault location may correspond to a line of code that defines a variable that is an integer but the candidate method invocation may return a string. The return type relationship in the second example may reflect that the candidate method invocation may have a lower priority based on the return type relationship not being compatible. In the present disclosure, reference to return type relationship being compatible with the fault location indicates that the return type of the candidate method invocation may be used at the fault location in a manner that is compatible with the code at the fault location.

In some embodiments, the return type relationship score may have a value of "0" or "1" in which a score of "1" indicates that the return type of the candidate method invocation is compatible with the fault location and a score of "0" indicates a low likelihood of the corresponding synthesized candidate method invocation being a valid repair for the fault. For example, the candidate method invocation in the first example given above may be given a return type relationship score of "1" based on the return type being compatible with the fault location. In contrast, the candidate method invocation in the second example given above may be given a return type relationship score of "0" based on the return type not being compatible with the fault location.

At block 504, one or more distance scores may be determined for the candidate method invocation based on the relative locations of the objects of the candidate method invocations with respect to the fault location. In some embodiments, a distance score may be determined for each object that may be used by the candidate method invocation. For example, a distance score may be determined for the defined object of the candidate method invocation and for each of the objects used as arguments in the candidate method invocation.

In some instances, the closer that objects are located in the code to the fault location of the code, the more likely it may be that the objects are useful in repairing the fault at the fault location. As such, in some embodiments, candidate method invocations that use objects that are located close to the fault location may be prioritized over candidate method invocations that use objects that are located further away from the fault location. In some embodiments, the distance scores may reflect this prioritization. In the present disclosure, reference to a location of an object may refer to a location in the code of the software program where the object name may be used. Further, reference of a location of an object with respect to the fault location may refer to an indication as to how many lines of code the object is to the fault location, which may also be referred to as the distance between the object and the fault location.

By way of example, in some embodiments, the distance scores may be determined by merely determining a number of lines of code that may be between the fault location and the locations of each of the objects and using the determined number of lines as the resulting distance score. For example, an object that is within two lines of the fault location may be given a distance score of "2." In such instances, a lower distance score may be given a higher priority over a higher distance score.

In these or other embodiments, the distance scores may be normalized to have a value between "0" and "1" in which a score of "1" indicates that the object is located at the fault location and in which a score of "0" indicates that the object is located as far away from the fault location as possible. For example, in some embodiments, the distance score for each object may be determined using the following expression:

$$\frac{\text{Total number of Lines of Code} - \text{Determined Distance}}{\text{Total number of Lines of Code}}$$

In the above expression, "Total Number of Lines of Code" refers to the number of lines of code in the method of the software program that corresponds to the fault location and "Determined Distance" refers to the number of lines of code between the fault location and the object last used. For example, the candidate method invocation may include a first object, a second object, and a third object. The "Total Number of Lines of Code" may be twenty, the first object may have a location three lines away from the fault location, the second object may have a location one line away from the fault location, and the third object may have a location six lines away from the fault location. A first distance score for the first object may be "0.85" ("(20−3)/20"), a second distance score for the second object may be "0.95" ("(20−1)/20"), and a third distance score for the third object may be "0.70" ("(20−6)/20").

In some instances, more than one occurrence of the object may be included in the code such that the object may have more than one distance with respect to the fault location. In some embodiments, the distance score for the object may be based on the occurrence of the object that is closest to the fault location, the occurrence of the object that is furthest from the fault location, an average of the distances from the fault location, or any other suitable distance or combination of distances.

At block 506, one or more occurrence scores may be determined for the candidate method invocation based on a number of occurrences of the objects of the candidate method invocation. In some embodiments, an occurrence score may be determined for each object that may be used by the candidate method invocation. For example, an occurrence score may be determined for the defined object of the candidate method invocation and for each of the objects used as arguments in the candidate method invocation.

In some instances, the more times that objects are used in the code within a vicinity of the fault location of the code, the more likely it may be that the objects are useful in repairing the fault at the fault location. As such, in some embodiments, candidate method invocations that use objects that occur multiple times within a vicinity of the fault location may be prioritized over candidate method invocations that use objects that occur fewer times within the vicinity of the fault location. In some embodiments, the occurrence scores may reflect this prioritization. In the present disclosure, reference to being within a vicinity of the fault location may refer to being within a certain number of lines of code of the fault location. For example, occurrences that are plus or minus the certain number of lines from the fault location may be deemed to be within the vicinity. The number of lines that may be used for such a determination may vary depending on the particular software program and may be based on previous empirical knowledge and/or may be learned from a training dataset using a machine learning technique.

By way of example, in some embodiments, the occurrence scores may be determined by merely determining a number of occurrences of a particular object that may be within the vicinity of the fault location. For example, an object that occurs three times within the vicinity may be given an occurrence score of "3". In such instances, a higher occurrence score may be given a higher priority over a lower occurrence score.

In these or other embodiments, the occurrence scores may be normalized to have a value between "0" and "1" in which the closer the occurrence score is to "1" the more occurrences the corresponding object may have in the vicinity as compared to other objects and in which a score of "0" indicates that the object has no occurrences within the vicinity. For example, in some embodiments, the occurrence score for each object may be determined using the following expression:

$$\frac{\text{Number of Occurrences of Subject Object}}{\text{Maximum Number of Occurrences Of Any Object}}$$

In the above expression, "Number of Occurrences of Subject Object" refers to the number of occurrences of the object that is being scored that are within the vicinity of the fault location and "Maximum Number of Occurrences Of Any Object" refers to the number of occurrences of any object of the candidate method invocation that occur within the vicinity. For example, the candidate method invocation may include a first object, a second object, and a third object. The first object may have three occurrences within the vicinity, the second object may have five occurrences within the vicinity, and the third object may have no occurrences within the vicinity. A first occurrence score for the first object may be "0.6" ("3/5"), a second occurrence score for the second object may be "1.0" ("5/5"), and a third occurrence score for the third object may be "0" ("0/5+").

At block 508, a semantic similarity score may be determined for the candidate method invocation. The semantic similarity score may indicate a semantic similarity of the name of the subject method of the candidate method invocation with the name of the method where the fault lies (referred to as a "fault location method").

In some instances, objects in the software program are often given names that indicate their type, functionality, etc. such that objects with similar names may be more related to each other than objects with different names. As such, the closer the name of the method of the candidate method invocation that may be used as a repair is to the name of the method of the fault location method, the more likely it may be that the candidate method invocation may be related to the fault location method and thus may be more useful in repairing the fault at the fault location. As such, in some embodiments, candidate method invocations with method names that are textually similar (also referred to as being semantically similar) to the method name of the fault location method may be prioritized over candidate method invocations that have method names that are less textually similar. In some embodiments, the semantic similarity score of the candidate method invocation may reflect this prioritization.

By way of example, in some embodiments, a textual similarity analysis may be performed with respect to the method name of the candidate method invocation and the method name of the fault location method. For example, in some embodiments the textual similarity may be determined by a Longest Common Subsequence (LCS) algorithm or a Jaccard Similarity Coefficient. Textual similarity could be also considered as the opposite of textual dissimilarity. Therefore, any applicable algorithms related to textual dissimilarity determinations such as edit distance may be used as well. Additionally or alternatively, in some embodiments the textual similarity analysis may be used to generate a semantic similarity score between the method name of the candidate method invocation and the method name of the fault location method. The more that a semantic similarity score indicates a closer degree of similarity, the more the priority that may be assigned to the semantic similarity score. For example, a semantic similarity score that indicates a relatively high degree of similarity may be given priority over a score that indicates a relatively low degree of similarity.

In these or other embodiments, the semantic similarity score may be normalized to have a value between "0" and "1" in which a score of "1" indicates that the method name of the candidate method invocation matches that of the fault location method and in which a score of "0" indicates that the method name of the candidate method invocation has little to no similarity to that of the fault location method. For example, in some embodiments, the semantic similarity score may be determined using the following expression:

$$\frac{\text{Textual Similarity of Subject Object}}{\text{Maximum Textual Similarity of Any Object}}$$

In the above expression, "Textual Similarity of Subject Object" refers to the similarity score between the subject object and the fault location method and "Maximum Textual Similarity of Any Objects" refers to the similarity score of the object, which is most similar to the fault location method. For example, a fault location method may include a first object, a second object, and a third object. The similarity scores of first object, second object, and third object may be 0.3, 0.0, and 0.5 respectively. Therefore, the normalized similarity score for the first object may be "0.6" ("0.3/0.5"), the normalized similarity score for the second object may be "0.0" ("0.0/0.5"), and the normalized similarity score for the third object may be "1.0" ("0.5/0.5").

At block 510, the context score may be generated for the candidate method invocation in some embodiments. In some embodiments, the context score may be based on or include the return type relationship score, one or more distance scores, one or more occurrence scores, the semantic similarity score, or any suitable combination thereof. In some embodiments, the context score may include a combination of all of the above score types. Additionally or alternatively, in instances in which the context score includes a combination of the above score types, the above score types may be normalized.

For example, in some embodiments, the return type relationship score for the candidate method invocation may have a value of "0" or "1," such as described above; the distance score for each object of the candidate method invocation may be normalized to have a value between "0" and "1," as described above; the occurrence score for each object of the candidate method invocation may be normalized to have a value between "0" and "1," such as described above; and the semantic similarity score may be normalized to have a value between "0" and "1," such as described above. In some embodiments, the context score may include an average of the return type relationship score, the distance scores, the occurrence scores, and the semantic similarity score of the candidate method invocation.

Additionally or alternatively, the context score may include a weighted average in which one or more of the above score types are given different weights based on a determined degree of importance of the corresponding factors with respect to prioritizing the candidate method invocation. For example, in some instances whether or not the return type of the candidate method invocation is compatible with the fault location may be a higher indicator of efficacy of the candidate method invocation than the semantic similarity between the method names. In such instances, the return type relationship score may be given a higher weight than the semantic similarity score. In some embodiments, the weight of a certain attribute may depend on how much that attribute is correlated with the previous patches. Additionally or alternatively, in some embodiments, the weights may be determined based on data associated with the previous patches. In these or other embodiments, the weights may be determined using a machine learning algorithm.

Additionally or alternatively, in some embodiments, two or more of the scores related to the context score may be combined using a mathematical model learned using various machine learning techniques such as linear regression, logistic regression, decision tree techniques, or random forest techniques.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used.

Figure 6:
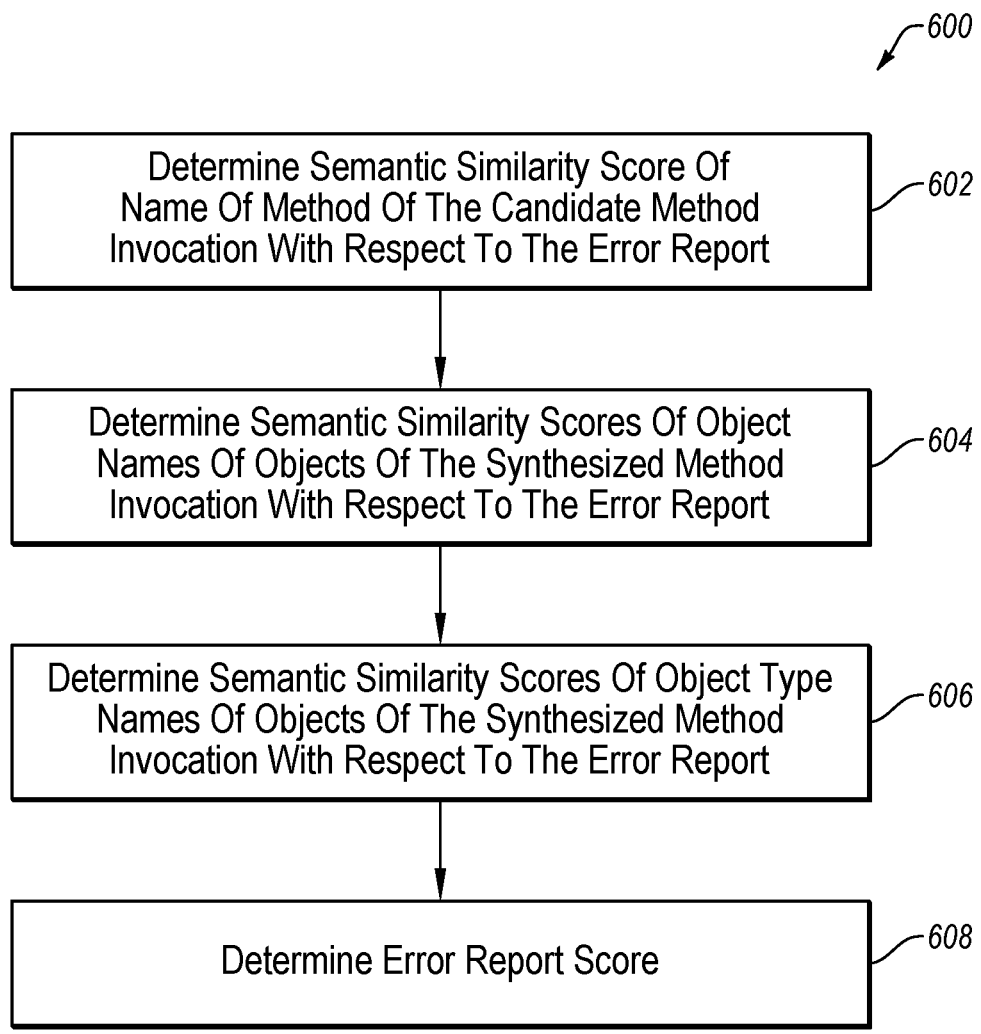
FIG. 6 depicts a flowchart of an example method of determining an error report score of a method invocation that may be a repair candidate for a fault location.

FIG. 6 depicts a flowchart of an example method 600 of determining an error report score, according to at least one embodiment described in the present disclosure. The method 600 may be performed by any suitable system, apparatus, or device with respect to code under test (e.g., the code under test 104 of FIG. 1). For example, the repair module 106 of FIG. 1 or the computing system 202 of FIG. 2 (e.g., as directed by a repair module) may perform or direct performance of one or more of the operations associated with the method 600 with respect to a method invocation (e.g., a synthesized method invocation such as described above) that may be a potential repair candidate for a fault location of code under test of the software program (referred to as a "candidate method invocation"). Although illustrated with discrete blocks, the steps and operations associated with one or more of the blocks of the method 600 may be divided into additional blocks, combined into fewer blocks, or eliminated, depending on the particular implementation.

The method 600 may begin at block 602, where one or more method name semantic similarity scores may be determined with respect to the method name of the candidate method invocation with respect to an error report that may correspond to the fault location. In some instances, the error report may include terms (e.g., object names) from the software program that may have experienced a problem due to the fault at the fault location. Additionally, as indicated above, objects in the software program are often given names that indicate their type, functionality, etc., such that objects with similar names may be more related to each other than objects with different names. As such, the closer the name of the method of the candidate method invocation that may be used as a repair is to words included in the error report (e.g., objects affected by the fault location), the more likely it may be that the candidate method invocation may be useful in repairing the fault at the fault location that corresponds to the error report. As such, in some embodiments, candidate method invocations with method names that are textually similar (also referred to as being semantically similar) to one or more words included in the error report may be prioritized over candidate method invocations that have method names that are less textually similar to the words of the error report.

In some embodiments, a method name semantic similarity score may be determined with respect to the method name of the candidate method invocation and every word included in the error report. Additionally or alternatively, a method name semantic similarity score may be determined with respect to the method name of the candidate method invocation and the words included in the error report.

In some embodiments, the method name semantic similarity scores may be generated in a similar, analogous, or same manner as described above with respect to determining the semantic similarity score of block 508 of the method 500. Additionally or alternatively, the method name semantic similarity scores may be normalized in a similar, analogous, or same manner as also described above with respect to block 508.

Additionally or alternatively, in some embodiments, with respect to multiple method name semantic similarity scores of the candidate method invocation with respect to the error report, the highest method name semantic similarity score may be used as the method name semantic similarity score of the candidate method invocation. In these or other embodiments, all the method name semantic similarity scores may be averaged and the average may be used as the method name semantic similarity score of the candidate method invocation.

At block 604, an object name semantic similarity score may be determined with respect to one or more of the names of the objects used by the candidate method invocation with respect to the error report that may correspond to the fault location.

In some instances, the closer the name of an object of the candidate method invocation that may be used as a repair is to words included in the error report (e.g., objects affected by the fault location), the more likely it may be that the candidate method invocation may be useful in repairing the fault at the fault location that corresponds to the error report. As such, in some embodiments, candidate method invocations that use objects with object names that are textually similar to one or more words included in the error report may be prioritized over candidate method invocations that use objects with object names that are less textually similar to the words of the error report.

In some embodiments, one or more object name similarity scores may be determined with respect to each object that may be used by the candidate method invocation. Additionally or alternatively, an object name semantic similarity score may be determined with respect to an object and every word included in the error report. Additionally or alternatively, an object name semantic similarity score may be determined with respect to an object and a subset of the words included in the error report.

In some embodiments, the object name semantic similarity scores may be generated in a similar, analogous, or same manner as described above with respect to determining the semantic similarity score of block 508 of the method 500. Additionally or alternatively, the object name semantic similarity scores may be normalized in a similar, analogous, or same manner as also described above with respect to block 508.

Additionally or alternatively, in some embodiments, with respect to multiple object name semantic similarity scores of a particular object, the highest object name semantic similarity score may be used as the object name semantic similarity score of the particular object. In these or other embodiments, all the object name semantic similarity scores may be averaged and the average may be used as the object name semantic similarity score of the particular object.

At block 606, an object type semantic similarity score may be determined with respect to one or more of the type names of the object types that correspond to the objects used by the candidate method invocation with respect to the error report that may correspond to the fault location. In some instances, the closer the type name of an object of the candidate method invocation that may be used as a repair is to words included in the error report (e.g., objects affected by the fault location), the more likely it may be that the candidate method invocation may be useful in repairing the fault at the fault location that corresponds to the error report. As such, in some embodiments, candidate method invocations that use objects of types with type names that are textually similar to one or more words included in the error report may be prioritized over candidate method invocations that use objects of types with type names that are less textually similar to the words of the error report.

In some embodiments, one or more object type name similarity scores may be determined with respect to each object that may be used by the candidate method invocation. Additionally or alternatively, an object type semantic similarity score may be determined with respect to an object and every word included in the error report. Additionally or alternatively, an object type semantic similarity score may be determined with respect to an object and a subset of the words included in the error report.

In some embodiments, the object type semantic similarity scores may be generated in a similar, analogous, or same manner as described above with respect to determining the semantic similarity score of block 508 of the method 500. Additionally or alternatively, the object type semantic similarity scores may be normalized in a similar, analogous, or same manner as also described above with respect to block 508.

Additionally or alternatively, in some embodiments, with respect to multiple object type semantic similarity scores of a particular object, the highest object type semantic similarity score may be used as the object type semantic similarity score of the particular object. In these or other embodiments, all the object type semantic similarity scores may be averaged and the average may be used as the object type semantic similarity score of the particular object.

At block 608, the error report score may be generated for the candidate method invocation in some embodiments. In some embodiments, the error report score may be based on or include the one or more method name semantic similarity scores related to the candidate method invocation, one or more object name semantic similarity scores related to the candidate method invocation, one or more object type semantic similarity scores related to the candidate method invocation, or any suitable combination thereof. In some embodiments, the error report score may include a combination of all of the above score types. Additionally or alternatively, in instances in which the error report score includes a combination of the above score types, the above score types may be normalized. Additionally or alternatively, the error report score may include an average of the normalized scores that are used.

Additionally or alternatively, the error report score may include a weighted average in which one or more of the above score types are given different weights based on a determined degree of importance of the corresponding factors with respect to prioritizing the candidate method invocation. For example, in some instances method name semantic similarity with respect to the error report may be a higher indicator of efficacy of the candidate method invocation than object type semantic similarity with respect to the error report. In such instances, the method name semantic similarity score may be given a higher weight than the object type semantic similarity score. In some embodiments, the weight of a certain attribute may depend on how much that attribute is correlated with the previous patches. Additionally or alternatively, in some embodiments, the weights may be determined based on data associated with the previous patches. In these or other embodiments, the weights may be determined using a machine learning algorithm Additionally or alternatively, in some embodiments, two or more of the scores related to the context score may be combined using a mathematical model learned using various machine learning techniques such as linear regression, logistic regression, decision tree techniques, or random forest techniques.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used.

Figure 7:
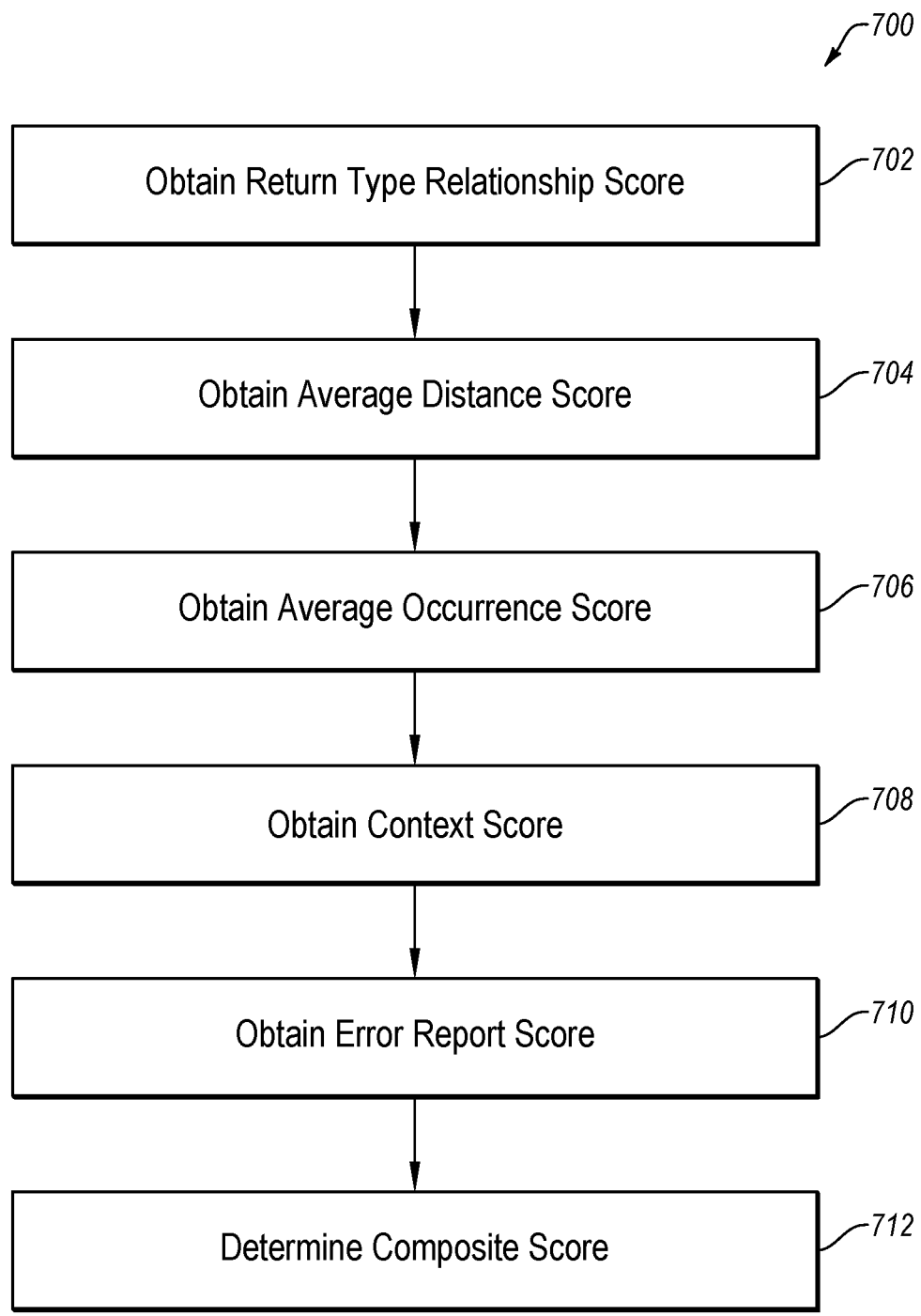
FIG. 7 depicts a flowchart of an example method of determining a composite score.

FIG. 7 depicts a flowchart of an example method 700 of determining a composite score, according to at least one embodiment described in the present disclosure. The method 700 may be performed by any suitable system, apparatus, or device with respect to code under test (e.g., the code under test 104 of FIG. 1). For example, the repair module 106 of FIG. 1 or the computing system 202 of FIG. 2 (e.g., as directed by a repair module) may perform or direct performance of one or more of the operations associated with the method 700 with respect to a method invocation (e.g., a synthesized method invocation such as described above) that may be a potential repair candidate for a fault location of code under test of the software program (referred to as a "candidate method invocation"). Although illustrated with discrete blocks, the steps and operations associated with one or more of the blocks of the method 700 may be divided into additional blocks, combined into fewer blocks, or eliminated, depending on the particular implementation.

The method 700 may begin at block 702, where a return type relationship score may be obtained for the candidate method invocation. In some embodiments, the return type relationship score may be analogous to that described above with respect to block 502 of the method 500 of FIG. 5. Additionally or alternatively, the return type relationship score may be obtained in a similar, analogous, or same manner as described above with respect to block 502 of the method 500 of FIG. 5. In these or other embodiments, the return type relationship score may be normalized. By way of example, the return type relationship score may be normalized in a similar, analogous, or same manner as described above with respect to block 502 of the method 500 of FIG. 5.

At block 704, an average distance score may be obtained for the candidate method invocation. In some embodiments, a distance score for one or more objects of the candidate method invocation may be obtained. In these or other embodiments, a distance score may be obtained for every object of the candidate method invocation and the distance scores may be analogous to those described above with respect to block 504 of the method 500 of FIG. 5. Additionally or alternatively, the distance scores may be obtained in a similar, analogous, or same manner as described above with respect to block 504 of the method 500 of FIG. 5. In these or other embodiments, the distance scores may be normalized. By way of example, the distance scores may be normalized in a similar, analogous, or same manner as described above with respect to block 504 of the method 500 of FIG. 5.

Additionally or alternatively, in some embodiments, the average distance score may be obtained by averaging the distance scores of the objects of the candidate method invocation. In some embodiments, the average may be a weighted average.

At block 706, an average occurrence score may be obtained for the candidate method invocation. In some embodiments, an occurrence score for one or more objects of the candidate method invocation may be obtained. In these or other embodiments, an occurrence score may be obtained for every object of the candidate method invocation and the occurrence scores may be analogous to those described above with respect to block 506 of the method 500 of FIG. 5. Additionally or alternatively, the occurrence scores may be obtained in a similar, analogous, or same manner as described above with respect to block 506 of the method 500 of FIG. 5. In these or other embodiments, the distance scores may be normalized. By way of example, the occurrence scores may be normalized in a similar, analogous, or same manner as described above with respect to block 506 of the method 500 of FIG. 5.

Additionally or alternatively, in some embodiments, the average occurrence score may be obtained by averaging the occurrence scores of the objects of the candidate method invocation. In some embodiments, the average may be a weighted average.

At block 708 a context score may be obtained for the candidate method invocation. In some embodiments, the context score may be obtained in a similar, analogous, or same manner as described above with respect to one or more blocks of the method 500 of FIG. 5.

At block 710 an error report score may be obtained for the candidate method invocation. In some embodiments, the error report score may be obtained in a similar, analogous, or same manner as described above with respect to one or more blocks of the method 500 of FIG. 5.

At block 712, the composite score may be generated for the candidate method invocation in some embodiments. In some embodiments, the composite score may be based on or include the return type relationship score, the average distance score, the average occurrence score, the context score, the error report score, or any suitable combination thereof. In some embodiments, the composite score may include a combination of all of the above score types. Additionally or alternatively, in instances in which the composite score includes a combination of the above score types, the above score types may be normalized. Additionally or alternatively, in some embodiments, the composite score may include an average of the normalized scores that are used.

In these or other embodiments, the composite score may include a weighted average in which one or more of the above score types are given different weights based on a determined degree of importance of the corresponding factors with respect to prioritizing the candidate method invocation. In some embodiments, the weight of a certain attribute may depend on how much that attribute is correlated with the previous patches. Additionally or alternatively, in some embodiments, the weights may be determined based on data associated with the previous patches. In these or other embodiments, the weights may be determined using a machine learning algorithm Additionally or alternatively, in some embodiments, two or more of the scores related to the context score may be combined using a mathematical model learned using various machine learning techniques such as linear regression, logistic regression, decision tree techniques, or random forest techniques.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a plurality of synthesized method invocations using a plurality of objects and a plurality of methods of a software program;
   determining a prioritization of the plurality of synthesized method invocations based on a context score based on relationships between one or more characteristics of each of the plurality of synthesized method invocations and a fault location and an error report score based on relationships between the one or more characteristics and an error report that corresponds to the fault location, the relationships between the one or more characteristics of each of the plurality of synthesized method invocations and the fault location being different from the relationships between the one or more characteristics and the error report;
   selecting a synthesized method invocation from the plurality of synthesized method invocations for repair operations with respect to the fault location based on a corresponding prioritization of the selected synthesized method invocation; and
   performing repair operations with respect to the fault location and the selected synthesized method invocation, the repair operations including adding the selected synthesized method invocation to the software program.

2. The method of claim 1, wherein the one or more characteristics of the selected synthesized method invocation include one or more of: objects used by the selected synthesized method invocation; a return type of the selected synthesized method invocation; a location of each of one or more of the objects used by the selected synthesized method invocation; a name of the method of the selected synthesized method invocation; a name of each of one or more of the objects used by the selected synthesized method invocation; a type of each of one or more of the objects used by the selected synthesized method invocation; a type of use of each of one or more of the objects in the selected synthesized method invocation; and a number of occurrences of each of one or more of the objects used by the selected synthesized method invocation.

3. The method of claim 2, wherein the relationships between the one or more of the characteristics of the selected synthesized method invocation and the fault location include one or more of: a return type relationship between the return type of the selected synthesized method invocation and the fault location; the location of each of one or more of the objects used by the selected synthesized method invocation with respect to the fault location; the number of occurrences of one or more of the objects used by the selected synthesized method invocation within a particular number of lines of the fault location; and a semantic similarity of the name of the method of the selected synthesized method invocation with a name of a method of a currently implemented method invocation that corresponds to the fault location.

4. The method of claim 2, wherein the relationships between the one or more of the characteristics of the selected synthesized method invocation and the error report include one or more of: a semantic similarity between the name of the method of the selected synthesized method invocation with respect to one or more words included in the error report; a semantic similarity between the name of one or more of the objects with respect to one or more words included in the error report; and a semantic similarity between a name of the type of one or more of the objects used by the selected synthesized method invocation with respect to one or more words included in the error report.

5. The method of claim 1, wherein the obtaining the plurality of synthesized method invocations includes:
   identifying the fault location in the software program;
   identifying as the plurality of objects, objects that are included in the software program and that are within a scope of the software program that corresponds to the fault location; and
   obtaining the plurality of synthesized method invocations by generating the plurality of synthesized method invocations using the plurality of objects.

6. The method of claim 5, further comprising:
   identifying a method from the plurality of objects;
   determining a method signature of the identified method;
   identifying one or more compatible objects that are compatible with the method signature; and
   generating one or more method invocations based on the identified method and the one or more compatible objects.

7. The method of claim 1, wherein the determining the prioritization of the plurality of synthesized method invocations based on the context score and the error report score of the method invocations includes removing one or more of the plurality of synthesized method invocations from consideration as a potential repair candidate based on the context score and error report score not satisfying a threshold level.

8. The method of claim 7, wherein the threshold level is based on available time and computation resources available for error correction operations.

9. The method of claim 1, wherein at least one non-transitory computer readable media is configured to store one or more instructions that, in response to being executed by at least one processor, cause a system to perform the method of claim 1.

10. A method comprising:
identifying a fault location in a software program;
generating a first prioritization score for a first synthesized method invocation based on a first context score based on one or more relationships between one or more first characteristics of the first synthesized method invocation and the fault location and a first error report score based on one or more relationships between one or more of the first characteristics and an error report that corresponds to the fault location, the relationships between the one or more of the first characteristics of the first synthesized method invocation and the fault location being different from the relationships between the one or more first characteristics and the error report;
generating a second prioritization score for a second synthesized method invocation based on a second context score based on one or more relationships between one or more second characteristics of the second synthesized method invocation and a second error report score based on the fault location and one or more relationships between one or more of the second characteristics and an error report that corresponds to the fault location, the relationships between the one or more of the second characteristics of the second synthesized method invocation and the fault location being different from the relationships between the one or more of the second characteristics and the error report;
determining a prioritization of the first synthesized method invocation with respect to the second synthesized method invocation based on the first prioritization score and the second prioritization score;
selecting the first synthesized method invocation for repair operations with respect to the fault location based on the prioritization of the first synthesized method invocation with respect to the second synthesized method invocation; and
performing repair operations with respect to the fault location and the first synthesized method invocation, the repair operations including adding the selected synthesized method invocation to the software program.

11. The method of claim 10, wherein the one or more first characteristics of the first synthesized method invocation include one or more of: objects used by the first synthesized method invocation; a return type of the first synthesized method invocation; a location of each of one or more of the objects used by the first synthesized method invocation; a name of the method of the first synthesized method invocation; a name of each of one or more of the objects used by the first synthesized method invocation; a type of each of one or more of the objects used by the first synthesized method invocation; a type of use of each of one or more of the objects in the first synthesized method invocation; and a number of occurrences of each of one or more of the objects used by the first synthesized method invocation.

12. The method of claim 11, wherein determining the first prioritization score includes performing one or more of:
determining a return type relationship score between the return type of the first synthesized method invocation and the fault location;
determining a distance score based on the location of each of one or more of the objects of the first synthesized method invocation with respect to the fault location;
determining the number of occurrences of one or more of the objects of the first synthesized method invocation within a particular number of lines of the fault location;
determining a semantic similarity between the name of the method of the first synthesized method invocation with a name of a method of a currently implemented method invocation that corresponds to the fault location;
determining a semantic similarity between the name of the method of the corresponding method invocation with respect to one or more words included in the error report;
determining a semantic similarity between the name of one or more of the objects of the first synthesized method invocation with respect to one or more words included in the error report; and
determining a semantic similarity between a name of the type of one or more of the objects of the first synthesized method invocation with respect to one or more words included in the error report.

13. The method of claim 10, further comprising:
identifying a plurality of objects that are included in the software program and that are within a scope of the software program that corresponds to the fault location;
identifying a plurality of methods of the software program that are within the scope of the software program that corresponds to the fault location; and
generating a plurality of synthesized method invocations using the plurality of objects and the plurality of methods, the plurality of synthesized method invocations including the first synthesized method invocation and the second synthesized method invocation.

14. The method of claim 10, wherein at least one non-transitory computer readable media is configured to store one or more instructions that, in response to being executed by at least one processor, cause a system to perform the method of claim 10.

15. A method comprising:
identifying a fault location in a software program;
generating a context score for each of a plurality of synthesized method invocations based on one or more relationships between one or more characteristics of each of the plurality of synthesized method invocations and the fault location;
determining an error report score for each of the plurality of synthesized method invocations based on one or more relationships between one or more of the characteristics and an error report that corresponds to the fault location;
determining a prioritization of the plurality of synthesized method invocations based on the context score and the error report score of each of the plurality of synthesized method invocations;
selecting a synthesized method invocation from the plurality of synthesized method invocations for repair operations with respect to the fault location based on a corresponding prioritization of the selected synthesized method invocation; and performing repair operations with respect to the fault location and the selected synthesized method invocation, the repair operations including adding the selected synthesized method invocation to the software program.

16. The method of claim 15, wherein the one or more characteristics of the selected synthesized method invocation include one or more of: objects used by the selected synthesized method invocation; a return type of the selected synthesized method invocation; a location of each of one or more of the objects used by the selected synthesized method invocation; a name of the method of the selected synthesized method invocation; a name of each of one or more of the objects used by the selected synthesized method invocation; a type of each of one or more of the objects used by the selected synthesized method invocation; a type of use of each of one or more of the objects in the selected synthesized method invocation; and a number of occurrences of each of one or more of the objects used by the selected synthesized method invocation.

17. The method of claim 16, wherein the relationships between the one or more of the characteristics of the selected synthesized method invocation and the fault location include one or more of: a return type relationship between the return type of the selected synthesized method invocation and the fault location; the location of each of one or more of the objects used by the selected synthesized method invocation with respect to the fault location; the number of occurrences of one or more of the objects used by the selected synthesized method invocation within a particular number of lines of the fault location; and a semantic similarity of the name of the method of the selected synthesized method invocation with a name of a method of a currently implemented method invocation that corresponds to the fault location.

18. The method of claim 16, wherein the relationships between the one or more of the characteristics of the selected synthesized method invocation and the error report include one or more of: a semantic similarity between the name of the method of the selected synthesized method invocation with respect to one or more words included in the error report; a semantic similarity between the name of one or more of the objects with respect to one or more words included in the error report; and a semantic similarity between a name of the type of one or more of the objects used by the selected synthesized method invocation with respect to one or more words included in the error report.

19. The method of claim 15, wherein at least one non-transitory computer readable media is configured to store one or more instructions that, in response to being executed by at least one processor, cause a system to perform the method of claim 15.

* * * * *